United States Patent [19]

Nakayama et al.

[11] Patent Number: 5,687,383

[45] Date of Patent: Nov. 11, 1997

[54] TRANSLATION RULE LEARNING SCHEME FOR MACHINE TRANSLATION

[75] Inventors: Keisuke Nakayama, Kanagawa; Satoshi Kinoshita, Tokyo, both of Japan

[73] Assignee: Kabushiki Kaisha Toshiba, Kawasaki, Japan

[21] Appl. No.: 536,756

[22] Filed: Sep. 29, 1995

[30] Foreign Application Priority Data

Sep. 30, 1994 [JP] Japan .................................. 6-259705

[51] Int. Cl.⁶ .................................................. G06F 17/28
[52] U.S. Cl. ............................................ 395/752; 395/759
[58] Field of Search ........................................ 375/752, 759

[56] References Cited

FOREIGN PATENT DOCUMENTS 5-151260  6/1993  Japan .
7244665   9/1995  Japan .............................. G06F 17/28

OTHER PUBLICATIONS

Utsuro et al., "Lexical Knowledge Acquisition from Bilingual Corpora", Proc. of the 14th International Conference on Computational Linguistics, pp. 581–587, Aug. 1992.

Kaji et al., "Learning Translation Templates from Bilingual Text", Proc. of the 14th International Conference on Compputational Linguistics, pp. 672–678, Aug. 1992.

Watanabe, "A Method for Extracting Translation Patterns from Translation Examples", IBM Research, Tokyo Research Laboratory, pp. 292–301.

Tanaka, "Verbal Case Frame Acquisition from a Bilingual Corpus: Gradual Knowledge Acquisition", NHK Science and Technical Research Laboratories, pp. 727–731.

*Primary Examiner*—Gail O. Hayes
*Assistant Examiner*—George N. Stevens
*Attorney, Agent, or Firm*—Foley & Lardner

[57] ABSTRACT

A translation rule learning scheme for a machine translation using a computer, in which an original sentence in a first language and a translated sentence in a second language of a bilingual text are analyzed to obtain dependency structures indicating a predicate and a case information associated with the predicate in each language; case frame correspondences between the first and second languages are estimated by estimating correspondences of words in the dependency structures in the first and second languages according to a bilingual dictionary; the estimated case frame correspondences are modified by comparing the case information in the dependency structures in the first and second languages and estimating a missing case information in one language from an existing case information in another language; and translation rules are extracted from the modified case frame correspondences.

20 Claims, 20 Drawing Sheets

FIG. 4

(1) Those having "が" case & "を" case in Japanese.

(2) Those having "が" case in Japanese.

(3) Those having "を" case in Japanese.

FIG. 6

| | | | |
|---|---|---|---|
| PREDICATE REGION | | JAPANESE | 持つ |
| | | ENGLISH | hold |
| | | SCORE | 7 |
| CASE INFORMATION REGION | CASE 1 | JAPANESE CASE | が |
| | | JAPANESE | ピッチャー |
| | | ENGLISH CASE | subj |
| | | ENGLISH | pitcher |
| | | SCORE | 10 |
| | CASE 2 | JAPANESE CASE | を |
| | | JAPANESE | ボール |
| | | ENGLISH CASE | obj |
| | | ENGLISH | ball |
| | | SCORE | 10 |
| | CASE n | SCORE | — |
| PREDICATE REGION | | JAPANESE | — |

FIG. 7A
ピッチャーがボールを持つ。
FIG. 7B
The pitcher holds a ball.
FIG. 8A
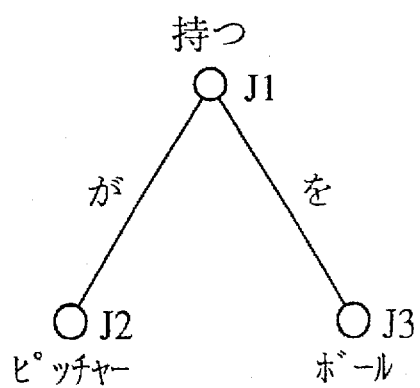
FIG. 8B
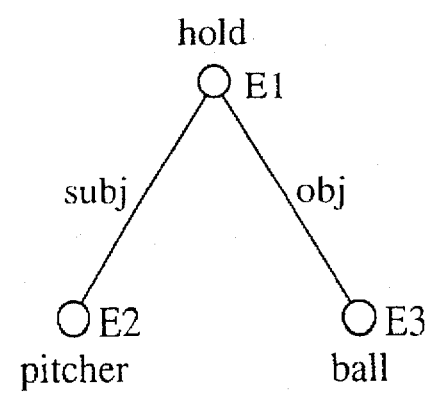

FIG. 10

| CORRECTION CANCEL | | OK |
|---|---|---|
| PREDICATE | ある=have | |
| CASE 1 | 問題(に)=question(obj) | |
| CASE 2 | = | |
| CASE 3 | = | |

FIG. 11

JAPANESE : この問題に質問があります。

ENGLISH : I have a question about it.

FIG. 12

ある=have | 問題（に）=question (obj)

FIG. 13

ある=have | 質問（が）=question (obj)
| 問題（に）=problem (about)

FIG. 16

| | | JAPANESE | ある |
|---|---|---|---|
| PREDICATE REGION | | ENGLISH | have |
| | | SCORE | 7 |
| CASE INFORMATION REGION | CASE 1 | JAPANESE CASE | に |
| | | JAPANESE | 問題 |
| | | ENGLISH CASE | obj |
| | | ENGLISH | question |
| | | SCORE | 7 |
| | CASE 2 | JAPANESE CASE | — |
| | | JAPANESE | — |
| | | ENGLISH CASE | — |
| | | ENGLISH | — |
| | | SCORE | — |
| | CASE n | SCORE | — |
| PREDICATE REGION | | JAPANESE | — |

FIG. 17

| | | | |
|---|---|---|---|
| PREDICATE REGION | | JAPANESE | ある |
| | | ENGLISH | have |
| | | SCORE | 7 |
| CASE INFORMATION REGION | CASE 1 | JAPANESE CASE | が |
| | | JAPANESE | 質問 |
| | | ENGLISH CASE | obj |
| | | ENGLISH | question |
| | | SCORE | 10 |
| | CASE 2 | JAPANESE CASE | に |
| | | JAPANESE | 問題 |
| | | ENGLISH CASE | about |
| | | ENGLISH | problem |
| | | SCORE | 10 |
| | CASE n | | |
| | | SCORE | — |
| PREDICATE REGION | | JAPANESE | — |

FIG. 19

| JAPANESE CASE | が | を | に | に | について | が |
|---|---|---|---|---|---|---|
| ENGLISH CASE | subj | obj | at | in | about | obj |

FIG. 20

JAPANESE : ピッチャーはボールを持ったまま空を見上げた。

ENGLISH : Holding the ball, he looked up the sky.

FIG. 21

持つ＝hold    | ボール（を）＝ ball (obj)

| ピッチャー（が）＝ ＜MISSING＞

FIG. 22

| | | JAPANESE | 持つ |
|---|---|---|---|
| PREDICATE REGION | | ENGLISH | hold |
| | | SCORE | 7 |
| CASE INFORMATION REGION | CASE 1 | JAPANESE CASE | を |
| | | JAPANESE | ボール |
| | | ENGLISH CASE | obj |
| | | ENGLISH | ball |
| | | SCORE | 10 |
| | CASE 2 | JAPANESE CASE | が |
| | | JAPANESE | ピッチャー |
| | | ENGLISH CASE | — |
| | | ENGLISH | — |
| | | SCORE | — |
| | CASE n | SCORE | — |
| PREDICATE REGION | | JAPANESE | 見上げる |
| | | ENGLISH | look up |
| | | SCORE | 10 |
| | CASE 1 | JAPANESE CASE | を |
| | | JAPANESE | 空 |

FIG. 23

| | | JAPANESE | 持つ |
|---|---|---|---|
| PREDICATE REGION | | ENGLISH | hold |
| | | SCORE | 7 |
| CASE INFORMATION REGION | CASE 1 | JAPANESE CASE | を |
| | | JAPANESE | ボール |
| | | ENGLISH CASE | obj |
| | | ENGLISH | ball |
| | | SCORE | 10 |
| | CASE 2 | JAPANESE CASE | が |
| | | JAPANESE | ピッチャー |
| | | ENGLISH CASE | subj |
| | | ENGLISH | pitcher |
| | | SCORE | 5 |
| | CASE n | | |
| | | SCORE | — |
| PREDICATE REGION | | JAPANESE | 見上げる |
| | | ENGLISH | look up |
| | | SCORE | |
| | CASE 1 | JAPANESE CASE | を |
| | | JAPANESE | 空 |

FIG. 25

持つ = hold　　| ボール（を）= ball (obj)

| ピッチャー（が）= pitcher (subj)

FIG. 26

(1) 持つ　| ピッチャー（が）　　hold | pitcher (subj)

| ボール（を）→　　　　| ball (obj)

(2) 持つ　| ピッチャー（が）→　hold | pitcher (subj)

(3) 持つ　| ボール（を）→　　　hold | ball (obj)

FIG. 27

持つ | 物（を）→ have | thing (obj)

FIG. 28

(i) 動詞 | 名詞1（が）　　verb | noun 1 (subj)

| 名詞2（を）→　　| noun 2 (obj)

(ii) 動詞 | 名詞（を）→　verb | noun (obj)

FIG. 29

| PLEASE SELECT TRANSLATION RULE TO BE LEARNED |
|---|
| ■ 持つ ｜ボール（を） → hold ｜ ball (obj) |
| □ 持つ ｜ピッチャー（が） → hold ｜ pitcher (subj) |
| ｜ボール（を） ｜ ball (obj) |

TRANSLATION RULE LEARNING SCHEME FOR MACHINE TRANSLATION

BACKGROUND OF THE INVENTION

1. Field of the Invention

The present invention relates to a translation rule learning scheme for a machine translation using a computer which translates natural language documents.

2. Description of the Background Art

In recent years, the advance of the natural language processing technique using a computer has prompted developments of various types of document processing systems. In particular, a machine translation system for automatically translating a large amount of documents into documents in different languages has been developed for practical use.

In order to translate the natural language document, it is necessary to provide a large scale natural language dictionary with a vocabulary of several tens of thousands to several hundreds of thousands words, and a grammatical knowledge in which the usage of the language is systematically defined. In addition, there are many situations in which it is also required to customize the translation results for different users or different types of documents to be translated. For this reason, a function for enabling the user to customize the translation results is provided by means of a user registration dictionary and/or a user rule dictionary.

Conventionally, such a user dictionary has been constructed manually, so that a considerable amount of efforts are required from the user in constructing the user dictionary. In order to resolve this problem, in recent years, there are propositions of schemes for automatically learning translation rules from the so called bilingual text containing a large amount of translated sentences obtained by human translators and corresponding original sentences. These schemes provides a translation rule learning system in which the bilingual sentences are analyzed in the original language and the translation target language to obtain correspondences in words, phrases, case frames, etc. between the analysis results in these two languages, and translation rules are automatically learned according to the obtained correspondences.

However, in such a scheme for automatically learning translation rules, if a correspondence obtained by the system is erroneous, a translation rule derived from that correspondence would also be erroneous inevitably. In addition, even when the system obtains a correct correspondence, if there are more than one translation rules that can possibly be learned from that correspondence, it is impossible for the system to judge which one of these possible translation rules is to be learned.

SUMMARY OF THE INVENTION

It is therefore an object of the present invention to provide a scheme for learning translation rules in which incorrect or incomplete correspondences between the bilingual sentences obtained by the system can be corrected by the system itself or a user.

It is another object of the present invention to provide a scheme for learning translation rules in which it is possible for a user to specify which one of possible translation rules is to be learned when there are more than one translation rules that can possibly be learned from the correspondence obtained by the system.

It is another object of the present invention to provide a scheme for learning translation rules in which it is possible for a user to set up conditions on translation rules to be learned such that desired types of translation rules can be learned by the system.

It is another object of the present invention to provide a translation rule learning system using the translation rule learning scheme according to the present invention.

According to one aspect of the present invention there is provided a method of translation rule learning for a machine translation, comprising the steps of: analyzing an original sentence in a first language and a translated sentence in a second language of a bilingual text to obtain dependency structures indicating a predicate and a case information associated with the predicate in each language; estimating case frame correspondences between the first and second languages by estimating correspondences of words in the dependency structures in the first and second languages according to a bilingual dictionary; modifying the estimated case frame correspondences by comparing the case information in the dependency structures in the first and second languages and estimating a missing case information in one language from an existing case information in another language; and extracting translation rules from the modified case frame correspondences.

According to another aspect of the present invention there is provided a translation rule learning system for a machine translation, comprising: a memory for storing a bilingual text containing original sentences in a first language and translated sentences in second language; analysis means for analyzing an original sentence in the first language and a translated sentence in the second language of the bilingual text to obtain dependency structures indicating a predicate and a case information associated with the predicate in each language; estimation means for estimating case frame correspondences between the first and second languages by estimating correspondences of words in the dependency structures in the first and second languages according to a bilingual dictionary; modification means for modifying the estimated case frame correspondences by comparing the case information in the dependency structures in the first and second languages and estimating a missing case information in one language from an existing case information in another language; and extraction means for extracting translation rules from the modified case frame correspondences.

Other features and advantages of the present invention will become apparent from the following description taken in conjunction with the accompanying drawings.

BRIEF DESCRIPTION OF THE DRAWINGS

FIG. 4 is an illustration of exemplary case patterns in Japanese that can be used in setting up a template for translation rules in the system of FIG. 1.

FIG. 6 is a diagram of an exemplary data structure in a case frame correspondence buffer used in the routine of FIG. 5.

FIGS. 7A and 7B are illustrations of an original Japanese sentence and a translated English sentence of an exemplary bilingual text that can be used in the routine of FIG. 5.

FIGS. 8A and 8B are illustrations of dependency structures in Japanese and English corresponding to the Japanese and English sentences of FIGS. 7A and 7B.

FIG. 10 is an illustration of an exemplary display screen image used in the routine of FIG. 9.

FIG. 11 is an illustration of an exemplary bilingual text used in the routine of FIG. 9.

FIG. 12 is an illustration of an incorrect case frame correspondence for the bilingual text of FIG. 11.

FIG. 13 is an illustration of a correct case frame correspondence for the bilingual text of FIG. 11.

FIG. 16 is a diagram of an exemplary data structure in a case frame correspondence buffer before a correction by a user in the routine of FIG. 9.

FIG. 17 is a diagram of an exemplary data structure in a case frame correspondence buffer after a correction by a user in the routine of FIG. 9.

FIG. 19 is an illustration of an exemplary bilingual case correspondence table used in the routine of FIG. 18.

FIG. 20 is an illustration of an exemplary bilingual text used in the routine of FIG. 18.

FIG. 21 is an illustration of an incomplete case frame correspondence for the bilingual text of FIG. 20.

FIG. 22 is a diagram of an exemplary data structure in a case frame correspondence buffer before a completion by a system in the routine of FIG. 18.

FIG. 23 is a diagram of an exemplary data structure in a case frame correspondence buffer after a completion by a system in the routine of FIG. 18.

FIG. 25 is an illustration of an exemplary case frame correspondence used in the routine of FIG. 24.

FIG. 26 is an illustration of three translation rule candidates extracted from the case frame correspondence of FIG. 25.

FIG. 27 is an illustration of an exemplary standard translation rule used in the routine of FIG. 24.

FIG. 28 is an illustration of two exemplary generic translation rules specified by a template for translation rules used in the routine of FIG. 24.

FIG. 29 is an illustration of an exemplary display screen image used in the routine of FIG. 24.

DETAILED DESCRIPTION OF THE PREFERRED EMBODIMENTS

Now, the embodiment of a translation rule learning scheme according to the present invention will be described in detail with references to the drawings.

Figure 1:
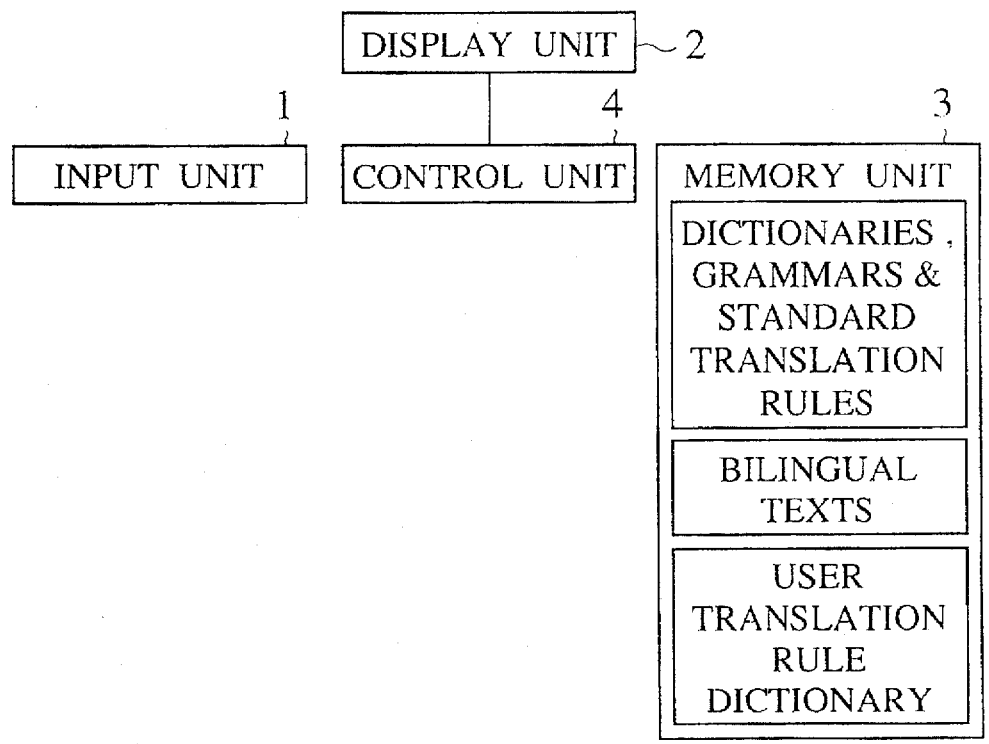
FIG. 1 is a schematic block diagram of a translation rule learning system in one embodiment of the present invention.

First, a translation rule learning system in this embodiment has a configuration as shown in FIG. 1, which comprises an input unit 1, a display unit 2, and a memory unit 3 which are connected with a control unit 4. The input unit 1 is a unit including a mouse, a keyboard, etc. by which a user specifies operations to the system. The display unit 2 is a unit including a CRT or window system displayed on a CRT for presenting system information to the user, or inquiring subsequent operations to the user. The memory unit 3 is a unit formed by a memory device, a magnetic disk, etc., which contains dictionaries, grammars, and standard translation rules for a machine translation system, bilingual texts to be used for learning, and a user translation rule dictionary for storing translation rules resulting from the learning. The control unit 4 controls the operations of the input unit 1, the display unit 2, and the memory unit 3, and executes the processing for the translation rule learning as described below.

Figure 2:
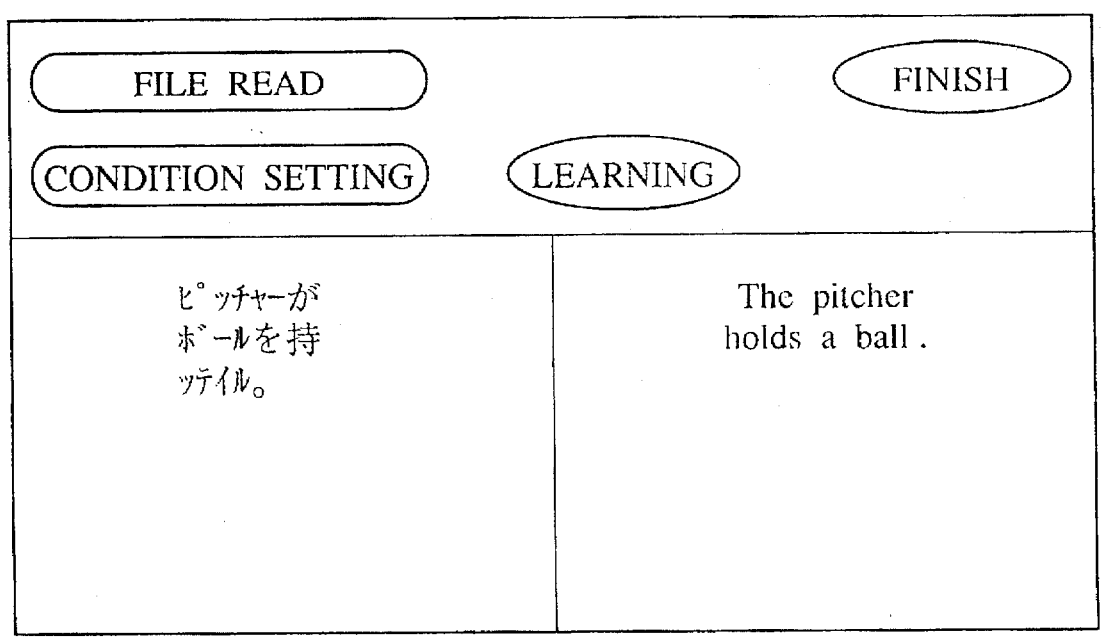
FIG. 2 is an illustration of an exemplary display screen image used in the system of FIG. 1.

FIG. 2 shows an exemplary screen image displayed on the display unit 2 in FIG. 1, which displays various buttons on an upper half, and the bilingual sentences on a lower half. When the user presses any of the buttons on an upper half, the control unit 4 is activated to cause a corresponding event.

Figure 3:
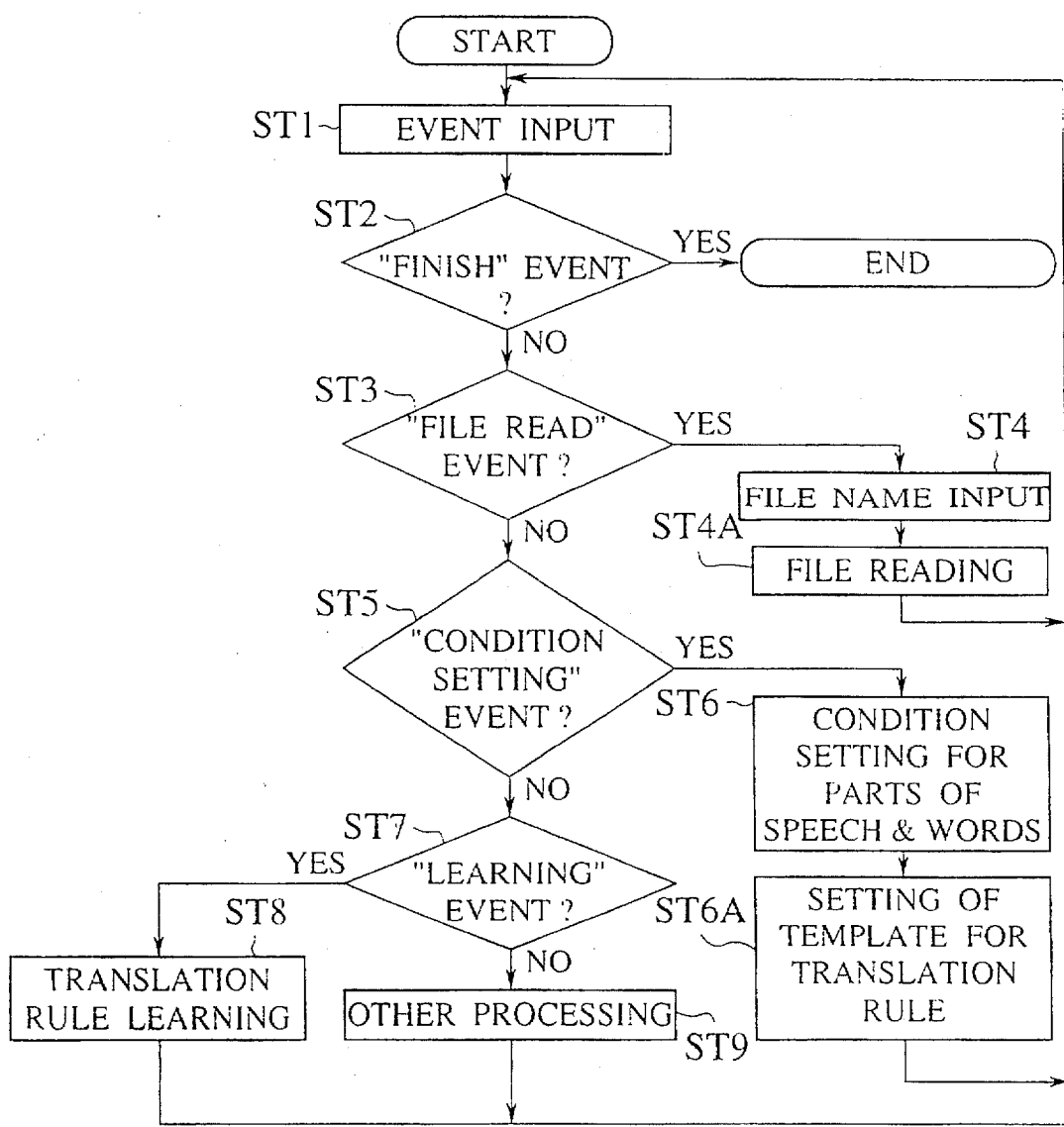
FIG. 3 is a flow chart for an overall operation in the system of FIG. 1.

FIG. 3 is a flow chart showing a flow of processing for events caused at the display unit 2 in FIG. 1.

At the step ST1, the event input is made by the user. Then, at the step ST2, whether the input event is "finish" or not is checked. When it is a "finish" event, the processing is terminated. Otherwise, at the step ST3, whether the input event is "file read" or not is checked. When it is a "file read" event, at the step ST4, the user specifies a file name of the bilingual text to be read, and at the step ST4A, the file of the bilingual text specified at the step ST4 is read out, and then the processing returns to the step ST1.

Otherwise, at the step ST5, whether the input event is "condition setting" or not is checked. When it is a "condition setting" event, at the step ST6, the user sets up the learning conditions on parts of speech and words to be used in the learning, and at the step ST6A, the user sets up a template for translation rules to be learned, and then the processing returns to the step ST1.

Otherwise, at the step ST7, whether the input event is "learning" of not is checked. When it is a "learning" event, at the step ST8, the learning of translation rules is carried out, and the processing returns to the step ST1.

Otherwise, at the step ST9, the other processing such as the selection of the bilingual sentence to be used for the learning is carried out, and the processing returns to the step ST1.

Here, the template for translation rules specified at the step ST6A in the flow chart of FIG. 3 indicates which case patterns are to be learned by the translation rule learning. For example, in the Japanese to English translation, any of three case patterns shown in FIG. 4 can be selected as the learning target case pattern.

Figure 5:
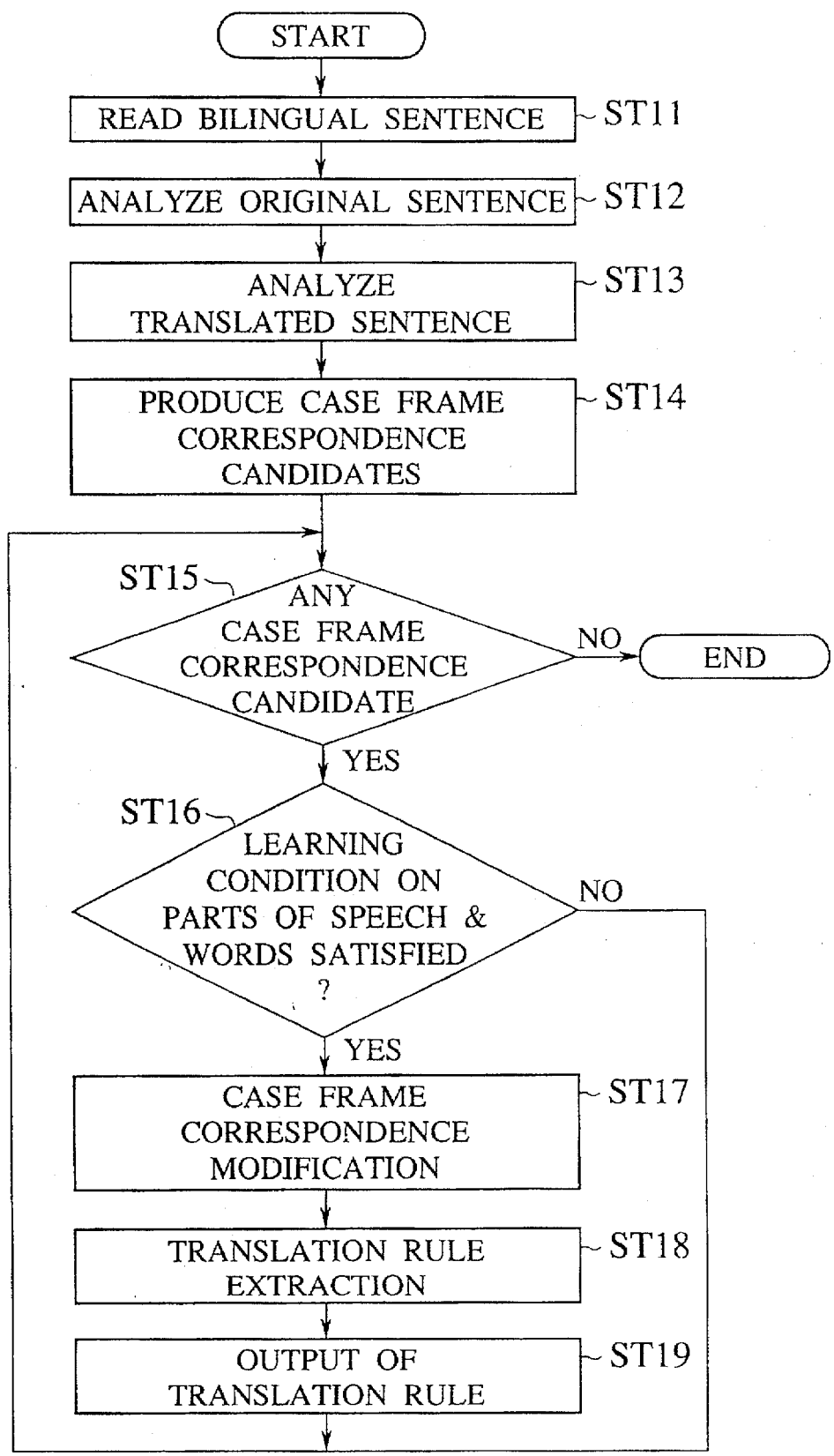
FIG. 5 is a flow chart for an operation in a translation rule learning routine used in the flow chart of FIG. 3.

FIG. 5 is a flow chart showing a flow of processing for the translation rule learning to be carried out at the step ST8 in FIG. 3.

At the step ST11, one bilingual sentence is read out from the bilingual text, and at the step ST12, the original sentence in the read out bilingual sentence is analyzed to obtain a dependency structure in the original sentence, while at the step ST13, the translated sentence in the read out bilingual sentence is analyzed to obtain a dependency structure in the translated sentence. Then, at the step ST14, the dependency structure in the original sentence and the dependency structure in the translated sentence are compared, to produce case frame correspondence candidates. The case frame correspondence candidates so produced are then stored in a case frame correspondence buffer having a data structure shown in FIG. 6.

Then, at the step ST15, it is checked whether there is any case frame correspondence candidate in the case frame correspondence buffer for which the extraction of translation rule is not yet carried out. If there is none, this translation rule learning routine is terminated and the processing returns to the main routine of FIG. 3. On the other hand, whenever there is a case frame correspondence candidate for which the extraction of translation rule is not yet carried out, next at the step ST16, whether the predicate in this case frame satisfies the learning conditions on the parts of speech and words specified at the step ST6 in FIG. 3 or not is checked. If the learning conditions are not satisfied, the processing returns to the step ST15 for the next case frame correspondence candidate.

On the other hand, when the learning conditions are satisfied, next at the step ST17, a case frame correspondence modification routine to be described below is called up, and then at the step ST18, a translation rule extraction routine to be described is called up, so as to obtain a user translation rule from the case frame correspondence which is then registered into the translation rule registration buffer. Then, at the step ST19, the user translation rule registered in the translation rule registration buffer is outputted to the user translation rule dictionary in the memory unit 3, and the processing returns to the step ST15 for the next case frame correspondence candidate.

For example, for the exemplary bilingual sentence having a Japanese sentence (original sentence) as shown in FIG. 7A and a corresponding English sentence (translated sentence) as shown in FIG. 7B, the dependency structures obtained at the step ST14 in FIG. 5 appear as shown in FIGS. 8A and 8B, respectively. Here, various methods for obtaining these dependency structures of FIGS. 8A and 8B by analyzing the sentences of FIGS. 7A and 7B are conventionally known so that their explanations will be omitted.

Also, in order to obtain a pair of corresponding words in two languages, such as a Japanese word J2 and an English word E2 shown in FIGS. 8A and 8B, it is possible to use any of the methods described in the following references: Japanese Patent Application Laid Open No. 5-151280 (1993); T. Utsuro, et al. "Lexical Knowledge Acquisition from Bilingual Corpora", Proc. of the 14th International Conference on Computational Linguistics, pp. 581–587, August, 1992; and H. Kaji, et al. "Learning Translation Templates from Bilingual Text", Proc. of the 14th International Conference on Computational Linguistics, pp. 672–878, August, 1992. It should be noted here that the methods described if these references estimate a correspondence between words by using a bilingual dictionary, so that there are occasions in which all the case information necessary for the translation rule extraction cannot be obtained as will be described later.

By means of these methods, it is possible to determine that a Japanese word J1 corresponds to an English word E1, a Japanese word J2 corresponds to an English word E2, and a Japanese word J3 corresponds to an English word E3 in FIGS. 8A and 8B, while the entire dependency structures of FIGS. 8A and 8B are corresponding case frames in Japanese and English. The step ST14 in FIG. 5 produces such corresponding case frames as the case frame correspondence candidate to be stored in the case frame correspondence buffer. The data structure shown in FIG. 6 corresponds to the dependency structures of FIGS. 8A and 8B.

Figure 9:
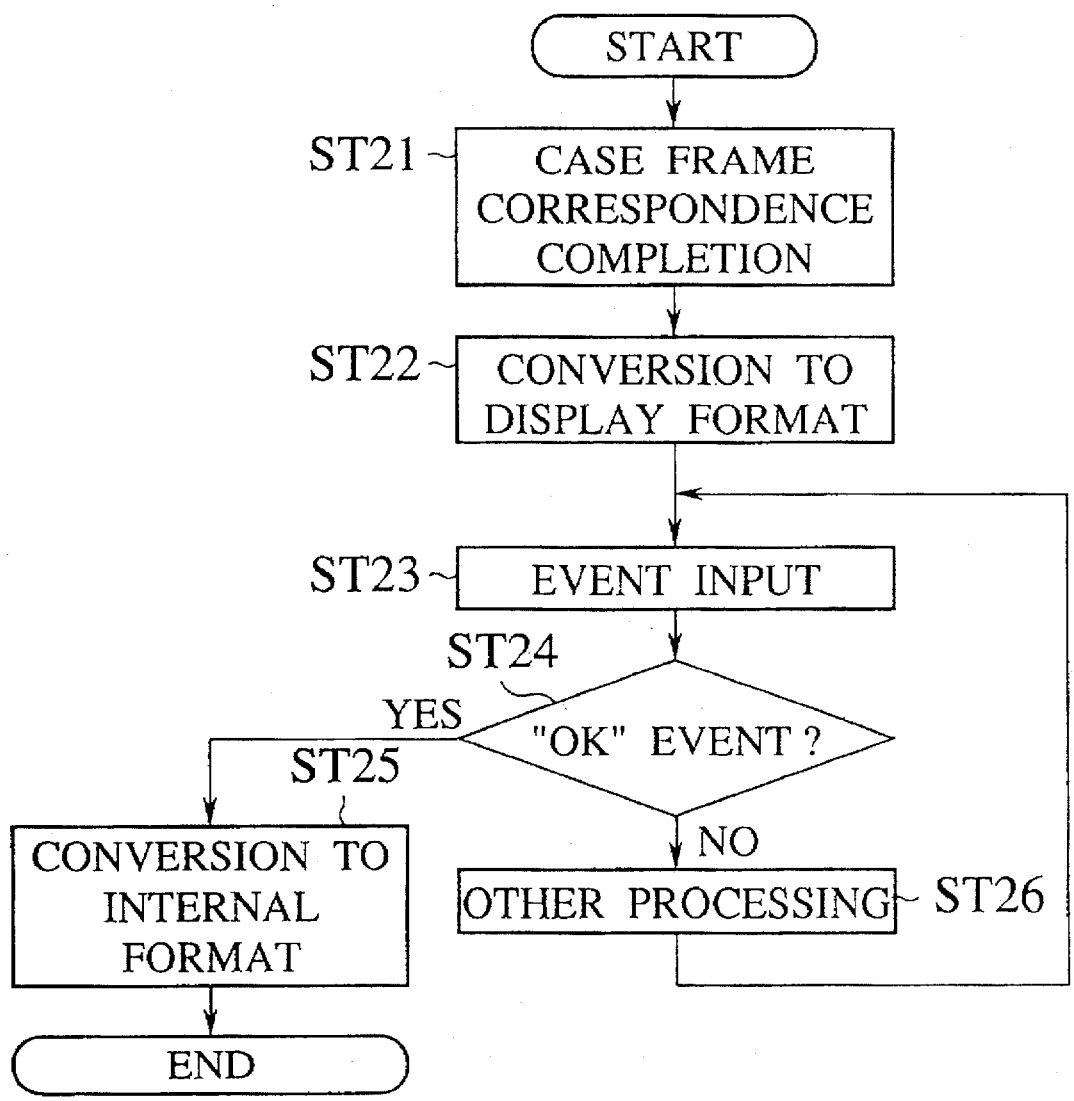
FIG. 9 is a flow chart for an operation in a case frame correspondence modification routine used in the routine of FIG. 5.

FIG. 9 is a flow chart showing a flow of processing for the case frame correspondence modification routine to be carried out at the step ST17 in FIG. 5.

At the step ST21, a case frame correspondence completion routine to be described below is called up to obtain a correspondence of words that cannot be estimated by using the bilingual dictionary so as to complete the incomplete case frame correspondence automatically on the system side. Then, at the step ST22, a content of the case frame correspondence buffer is converted into a display format, and presented to the user at the display unit 2 as shown in FIG. 10, so as to enable the user to inspect the case frame correspondence and enter the correction if necessary.

Then, an event input is made by the user at the step ST23, and whether the input event is "OK" or not is checked at the step ST24. When it is an "OK" event, it implies that the user has approved the currently displayed case frame correspondence, so that next at the step ST25, a displayed content at the display unit 2 is converted into an internal format for the case frame correspondence buffer, and registered into the case frame correspondence buffer, and then the processing returns to the translation rule learning routine of FIG. 5, whereas otherwise, next at the step ST26, the other processing such as the entry of the correction on the displayed case frame correspondence or the cancellation of the previously entered correction is carried out and the processing returns to the step ST23 for the next input event.

Here, the operation according to the flow chart of FIG. 9 will be illustrated in further detail for an example using the bilingual sentence as shown in FIG. 11. Now, suppose that an incorrect case frame correspondence candidate as shown in FIG. 12 is obtained by the steps ST11 to ST14 in FIG. 5. In this example, the operation to correct this incorrect case frame correspondence candidate of FIG. 12 into a correct case frame correspondence candidate as shown in FIG. 13 by the user will be carried out as follows.

First, at the step ST21, the case frame correspondence completion routine is called up, but there is nothing to be completed by the case frame correspondence completion routine in this example by assumption. Then, at the step ST22, the case frame correspondence candidate is converted into the display format, and displayed at the display unit 2 as in FIG. 10, and then the input from the user is awaited.

Figure 14:
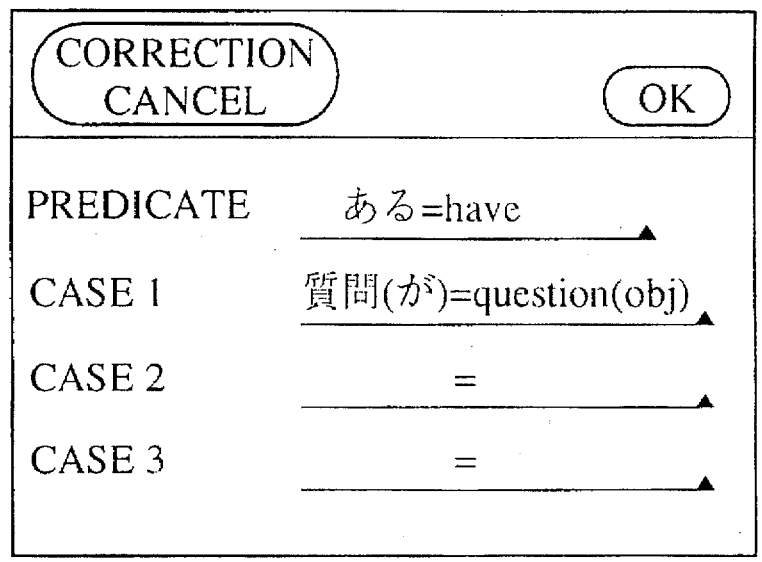
FIG. 14 is an illustration of an exemplary display screen image before a correction by a user in the routine of FIG. 9.
Figure 15:
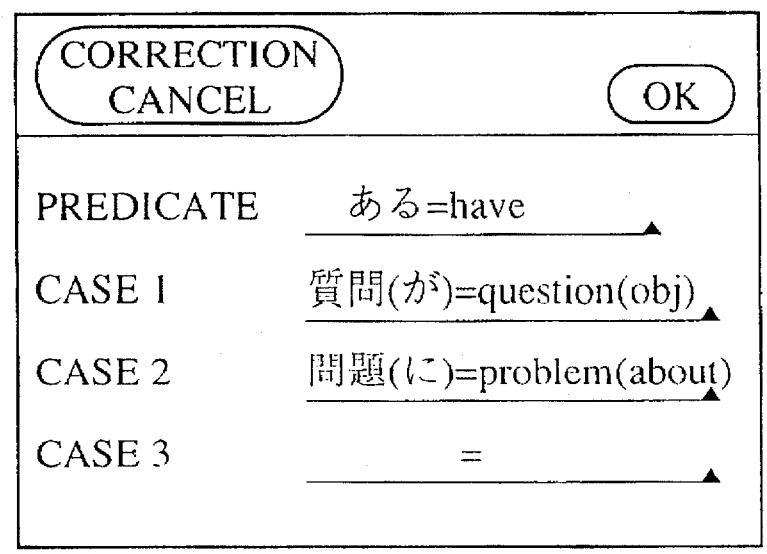
FIG. 15 is an illustration of an exemplary display screen image after a correction by a user in the routine of FIG. 9.

In this example, the incorrect correspondence is made in "case 1" entry, so that the user enters an input event to move a cursor to this "case 1" entry by means of the mouse and click a mouse button there for example at the step ST23. This input event is judges as not "OK" event at the step ST24, so that next at the step ST26, the both sides of an "=" symbol in the clicked "case 1" entry are set to a line editing mode, such that the user can enter the correction as shown in FIG. 14. In this example, by the similar procedure, the user also moves a cursor to the "case 2" entry by means of the mouse, clicks the mouse button there, and then enters another correction in "case 2" entry as shown in FIG. 15.

As this completes the necessary correction, the user presses the "OK" button on the displayed screen image. This input event is judged as the "OK" event at the step ST24, so that next at the step ST25, the displayed content at that point is converted into the internal format of the case frame correspondence buffer, and the registered into the case frame correspondence buffer. As a result, the content of the case frame correspondence buffer is changed from an incorrect one as shown in FIG. 16 to a correct one as shown in FIG. 17.

Figure 18:
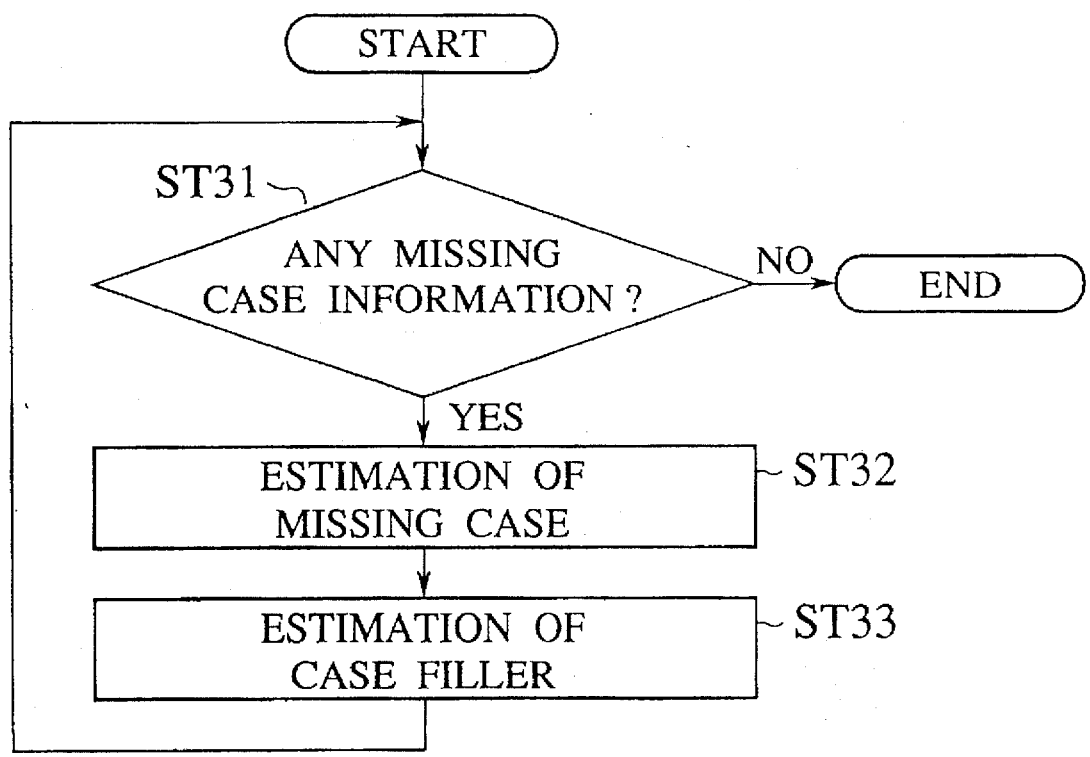
FIG. 18 is a flow chart for an operation in a case frame correspondence completion routine used in the routine of FIG. 9.

FIG. 18 is a flow chart showing a flow of processing for the case frame correspondence completion routine to be carried out at the step ST21 in FIG. 9.

At the step ST31, whether there is any case information which is missing for either language in the case frame correspondence buffer or not is checked. If there is none, there is nothing that can be completed automatically on the system side, so that this case frame correspondence completion routine is terminated and the processing returned to the the case frame correspondence modification routine of FIG. 9. On the other hand, whenever there is a missing case information, next at the step ST32, a case that is missing in one language is estimated by referring to a Japanese-English case correspondence table as shown in FIG. 19 which registers corresponding cases in Japanese and English. Then, at the step ST33, a case filler for filling a word that is missing in one language is estimated by looking up the dictionary, and the processing returns to the step ST31 for the next missing case information.

Here, the operation according to the flow chart of FIG. 18 will be illustrated in further detail for an example using the bilingual sentence as shown in FIG. 20. Now, suppose that an incomplete case frame correspondence candidate with a missing case information as shown in FIG. 21 is obtained by the steps ST11 to ST14 in FIG. 5. In this example, the operation to complete this incomplete case frame correspondence candidate of FIG. 21 by filling the missing case information on the system side will be carried out as follows.

First, at the step ST31, whether there is any case information which is missing in this case frame correspondence of FIG. 21 or not is checked, and there is a missing case information in this example, so that next at the step ST32, the Japanese-English case correspondence table of FIG. 19 is referred sequentially from a top, to estimate that the English case "subj" corresponds to the corresponding Japanese case in the missing case information, so that this English case "subj" is filled. Next, at the step ST33, the Japanese-English dictionary is looked up, to estimate the English case filler "pitcher" which corresponds to the corresponding Japanese word in the missing case information. Then, the processing returns to the step ST31, but there is no more missing case information in this example, so that the processing is terminated. As a result, the content of the case frame correspondence buffer is changed from an incomplete one as shown in FIG. 22 to a complete one as shown in FIG. 23.

Figure 24:
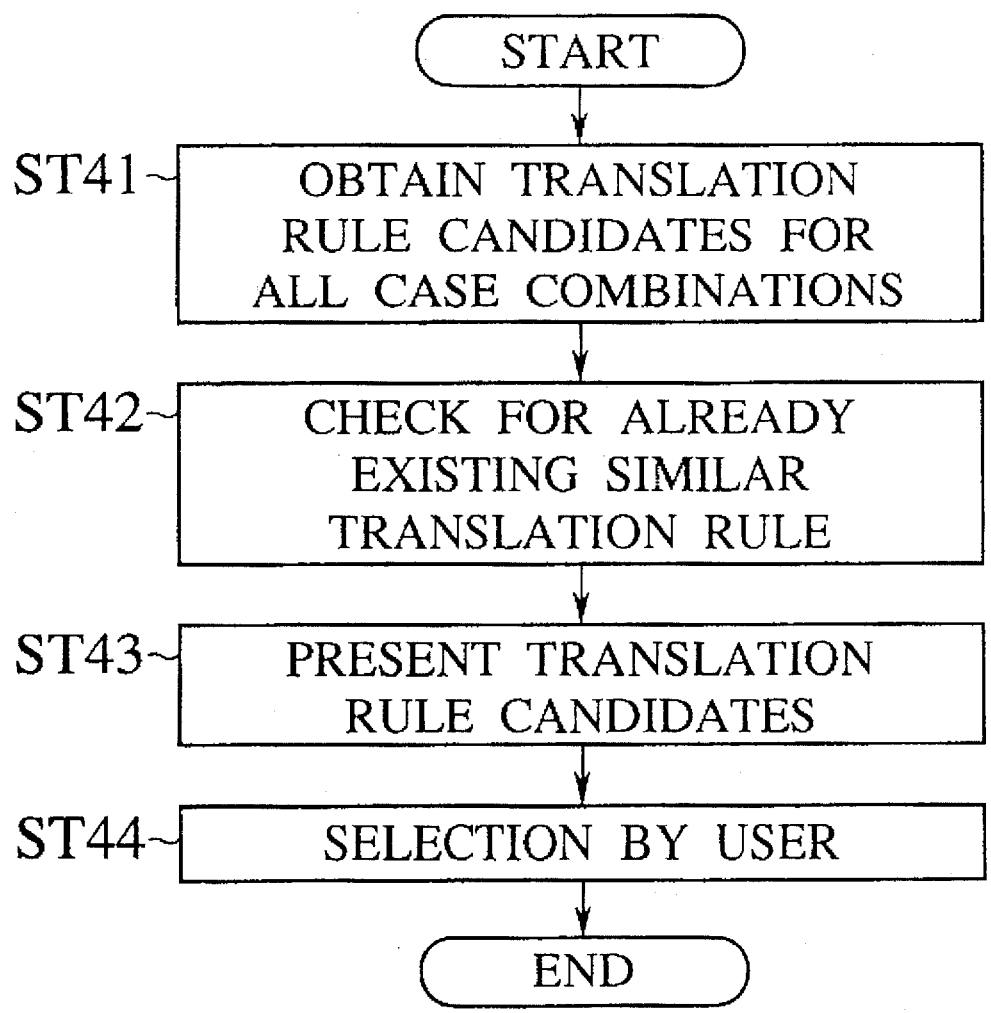
FIG. 24 is a flow chart for an operation in a translation rule extraction routine used in the routine of FIG. 5.

FIG. 24 is a flow chart showing a flow of processing for the translation rule extraction routine to be carried out at the step ST18 in FIG. 5.

At the step ST41, translation rule candidates for all combinations of cases are obtained by referring to the content of the case frame correspondence buffer, and one or more of the obtained translation rule candidates are registered into a translation rule candidate buffer. Then, at the step ST42, whether there is any already existing translation rule in the standard translation rule dictionary or the user translation rule dictionary which is similar to each of the translation rule candidates stored in the translation rule candidate buffer or not is checked, and the translation rule candidate for which the already existing similar translation rule exists is marked.

Next, at the step ST43, those translation rules in the translation rule candidate buffer which coincides with the template for translation rules specified at the step ST6A in FIG. 3 are presented to the user at the display unit 2. Here, when there is no specified template for translation rules, all the translation rule candidates in the translation rule candidate buffer are presented. Also, the marked translation rule candidates are displayed above the unmarked ones. Then, at the step ST44, the user selects one translation rule from the displayed translation rule candidates by means of the mouse for example, and the selected translation rule is stored into the translation rule registration buffer, and then the processing returns to the translation rule learning routine of FIG. 5.

Here, the operation according to the flow chart of FIG. 24 will be illustrated in further detail for an example using the case frame correspondence as shown in FIG. 25.

At the step ST41, the translation rule candidates for all case combinations, i.e., three translation rule candidates as shown in FIG. 26 in this example, are obtained and stored in the translation rule candidate buffer. At the step ST42, for each of the translation rule candidates (1), (2), and (3) in FIG. 26, whether there is a similar translation rule already exists or not is checked. Here, the similarity of the translation rules is judged in such a manner that, for example, when the standard translation rule dictionary has a translation rule as shown in FIG. 27, this translation rule of FIG. 27 will be judged as similar to the translation rule (3) in FIG. 26 according to the similarity of the case pattern, and consequently the translation rule (3) in FIG. 26 will be marked in this example.

Then, at the step ST43, the translation rule candidates in the translation rule candidate buffer are presented to the user at the display unit 2. Here, when the user specified the case patterns (1) and (3) in FIG. 4 as the template for translation rules at the step ST6A in FIG. 3, it implies that translation rules in two generic forms as shown in FIG. 28 are specified. Consequently, among the translation rule candidates (1), (2), and (3) in FIG. 26, only the translation rule candidates (1) and (3) in FIG. 26 will be selectively displayed as those which coincide with the specified template for translation rules. These translation rule candidates (1) and (3) in FIG. 26 are presented with the marked one above the unmarked one, i.e., the translation rule candidate (3) above the translation rule candidate (1) as shown in FIG. 29, where the blackened square at a top of the translation rule candidate indicates that this translation rule candidate is marked, while a blank square at a top of the translation rule candidate indicates that this translation rule candidate is unmarked.

Finally, at the step ST44, the user selects one of the two displayed translation rule candidates by means of the mouse for example. Here, the user can select the marked translation rule candidate, i.e., the translation rule candidate that can be obtained by only a partial modification of the already existing translation rule, with a higher priority. Thus, in this example, the user selects the translation rule candidate (3), i.e., that which is shown above in FIG. 29, this selected translation rule candidate will be stored as the user translation rule in the translation rule registration buffer.

As described, according to the above described embodiment of the present invention, it is possible for the system and/or the user to modify and correct the correspondence determined from the bilingual sentences by the system. In addition, it is possible to learn the translation rule which is effective in improving the quality of translation when there are a plurality of translation rules that can be learned from the given correspondence. Furthermore, it is possible to learn only those translation rules which satisfy the conditions set up by the user for translation rules to be learned.

It is to be noted that types of the learning conditions and the template for translation rules that can be set up at the steps ST6 and ST6A in FIG. 3 as described above are only exemplary, and any other suitable conditions and templates may be set up instead or in addition, in substantially the similar manners as described above.

It is also to be noted that the Japanese-English case correspondence table shown in FIG. 19 is only an example and any other suitable table different corresponding cases and their order may be used instead, if desired.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of translation rule learning for a machine translation, comprising the steps of:

analyzing an original sentence in a first language and a translated sentence in a second language of a bilingual text to obtain dependency structures indicating a predicate and a case information associated with the predicate in each language;

estimating case frame correspondences between the first and second languages by estimating correspondences of words in the dependency structures in the first and second languages according to a bilingual dictionary;

modifying the estimated case frame correspondences by comparing the case information in the dependency structures in the first and second languages and estimating a missing case information in one language from an existing case information in another language; and extracting translation rules from the modified case frame correspondences.

2. The method of claim 1, wherein the modifying step estimates the missing case information by estimating a missing case of the missing case information in one language from an existing case of the existing case information in another language according to a bilingual case correspondence table, and estimating a missing word of the missing case information in one language from an existing word of the existing case information in another language according to the bilingual dictionary.

3. The method of claim 1, wherein the modifying step also modifies the estimated case frame correspondences by presenting the estimated case frame correspondences to a user, and correcting the estimated case frame correspondences according to corrections specified by the user.

4. The method of claim 1, wherein the extracting step extracts the translation rules by presenting a plurality of translation rule candidates obtained from the modified case frame correspondences to a user, and selecting the translation rules from said plurality of translation rule candidates according to selections specified by the user.

5. The method of claim 4, wherein the extracting step presents said plurality of translation rule candidates by marking those translation rule candidates which are similar to already existing translation rules.

6. The method of claim 5, wherein the extracting step presents the marked translation rule candidates with a higher priority over unmarked translation rule candidates.

7. The method of claim 1, further comprising the step of:

setting conditions on parts of speech and words to be used in learning the translation rules according to user inputs.

8. The method of claim 7, wherein the estimating step estimates only those case frame correspondences which satisfy the conditions on parts of speech and words set by the setting step.

9. The method of claim 1, further comprising the step of:

setting a template for translation rules to be learned according to user inputs.

10. The method of claim 9, wherein the extracting step presents to a user those translation rule candidates obtained from the modified case frame correspondences which are matching with the template set by the setting step.

11. A translation rule learning system for a machine translation, comprising:

a memory for storing a bilingual text containing original sentences in a first language and translated sentences in second language;

analysis means for analyzing an original sentence in the first language and a translated sentence in the second language of the bilingual text to obtain dependency structures indicating a predicate and a case information associated with the predicate in each language;

estimation means for estimating case frame correspondences between the first and second languages by estimating correspondences of words in the dependency structures in the first and second languages according to a bilingual dictionary;

modification means for modifying the estimated case frame correspondences by comparing the case information in the dependency structures in the first and second languages and estimating a missing case information in one language from an existing case information in another language; and extraction means for extracting translation rules from the modified case frame correspondences.

12. The system of claim 11, wherein the modification means estimates the missing case information by estimating a missing case of the missing case information in one language from an existing case of the existing case information in another language according to a bilingual case correspondence table, and estimating a missing word of the missing case information in one language from an existing word of the existing case information in another language according to the bilingual dictionary.

13. The system of claim 11, wherein the modification means also modifies the estimated case frame correspondences by presenting the estimated case frame correspondences to a user at a display device, and correcting the estimated case frame correspondences according to corrections specified by the user at an input device.

14. The system of claim 11, wherein the extraction means extracts the translation rules by presenting a plurality of translation rule candidates obtained from the modified case frame correspondences to a user at a display device, and selecting the translation rules from said plurality of translation rule candidates according to selections specified by the user at an input device.

15. The system of claim 14, wherein the extraction means presents said plurality of translation rule candidates by marking those translation rule candidates which are similar to already existing translation rules.

16. The system of claim 15, wherein the extraction means presents the marked translation rule candidates with a higher priority over unmarked translation rule candidates.

17. The system of claim 11, further comprising:

setting means for setting conditions on parts of speech and words to be used in learning the translation rules according to user inputs at an input device.

18. The system of claim 17, wherein the estimation means estimates only those case frame correspondences which satisfy the conditions on parts of speech and words set by the setting means.

19. The system of claim 11, further comprising:

setting means for setting a template for translation rules to be learned according to user inputs at an input device.

20. The system of claim 19, wherein the extraction means presents to a user at a display device those translation rule candidates obtained from the modified case frame correspondences which are matching with the template set by the setting means.

* * * * *